United States Patent [19]
Inkster

[11] Patent Number: 5,836,326
[45] Date of Patent: Nov. 17, 1998

[54] BEAD CLEANSING SYSTEM

[75] Inventor: Guy William Inkster, Vernon, Canada

[73] Assignee: Clearly Canadian Beverage Corporation, Vancouver, Canada

[21] Appl. No.: 853,327

[22] Filed: May 8, 1997

[51] Int. Cl.$^6$ ........................................... B08B 3/04
[52] U.S. Cl. .................. 134/198; 134/200; 134/111; 134/104.3; 134/104.4
[58] Field of Search .................. 134/198, 104.3, 134/104.4, 109, 111, 200, 199, 133, 135, 104.2, 110, 186

[56] References Cited

U.S. PATENT DOCUMENTS

| | | | |
|---|---|---|---|
| 2,756,168 | 7/1956 | Ruggles | 134/200 |
| 2,760,365 | 8/1956 | Norton | 134/198 |
| 3,514,329 | 5/1970 | Hull | 134/200 |
| 3,791,630 | 2/1974 | Hinds, Jr. | 134/133 |
| 3,938,534 | 2/1976 | Akizawa | 134/133 |
| 4,728,042 | 3/1988 | Ersdal et al. | 134/104.3 |
| 4,753,258 | 6/1988 | Seiichiro | 134/198 |
| 4,769,219 | 9/1988 | Tasker et al. | 134/104.3 |
| 4,782,843 | 11/1988 | Lapaglia | 134/104.3 |
| 4,784,169 | 11/1988 | Striedieck | 134/111 |
| 4,844,276 | 7/1989 | Kunze et al. | 134/198 |

*Primary Examiner*—Amy B. Vanatta
*Attorney, Agent, or Firm*—Michael A. Glenn

[57] ABSTRACT

Apparatus and a method for cleaning a bead suspension of fragile beads having a high water content suspended in a liquid. The spray nozzles in vat cause turbulence in a suspension of water and beads such that flawed or damaged beads and beads fragments rise to the top of the vat and are discharged over the lip of the vat. The preservative is extracted from the suspension and filter to remove fines and microbes. The cleaned preservative and cleansed beads are recombined in a bead drum.

6 Claims, 1 Drawing Sheet

BEAD CLEANSING SYSTEM

FIELD OF THE INVENTION

This invention relates to an apparatus and process for a suspension of fragile beads having a high water content suspended in a liquid and for removing flawed beads and bead fragments from the suspension.

BACKGROUND OF THE INVENTION

Small flavor beads made of edible material are commercially available to enhance the taste of beverages. The beads have a very high water content and act much like miniature wet sponges. Such beads are manufactured and sold for example by Qualitech of Chaska, Minn. Such beads are very fragile and are difficult to deal with and to manipulate without causing damage to the beads. Because of this, they are typically supplied to beverage manufacturers in suspension in a preservative solution consisting basically of sugar, water and preservative such as sodium benzoate or potassium sorbate. The beads are ideally spherical. However, the suspension is often found to contain beads which are irregularly shaped, which creates difficulties in further processing and handling steps which are required to deliver the product to the beverage, or are otherwise damaged which makes the beads ineffectual for their intended purpose, or are not visually acceptable. The suspension also contains microbes and other fines, i.e. undesirable microscopic elements.

It is an object of this invention to provide an apparatus and process to remove the fines, microbes and flawed beads from the suspension while recovering the preservative. It is a further object of the invention to accomplish the foregoing without damaging the other beads in the suspension.

SUMMARY OF THE INVENTION

In one of its aspects, the invention comprises apparatus for cleaning a suspension of fragile beads having a high water content suspended in a liquid, comprising a cleansing vat for holding a quantity of said suspension, the vat having a top portion with discharge means. Flow nozzles are provided in the cleansing vat to induce turbulence in said vat whereby to clean the beads and to cause flawed beads and fines to rise to the top of the suspension and to be discharged by the discharge means.

In another of its aspects, there is also provided means for removing the preservative from the vat and cleaning the preservative, then combining the contents of the vat and the cleaned preservative.

Further aspects of the invention will be apparent from the claims, read in conjunction with the detailed description of the preferred embodiment of the invention.

DETAILED DESCRIPTION OF THE PREFERRED EMBODIMENT

Figure 1:
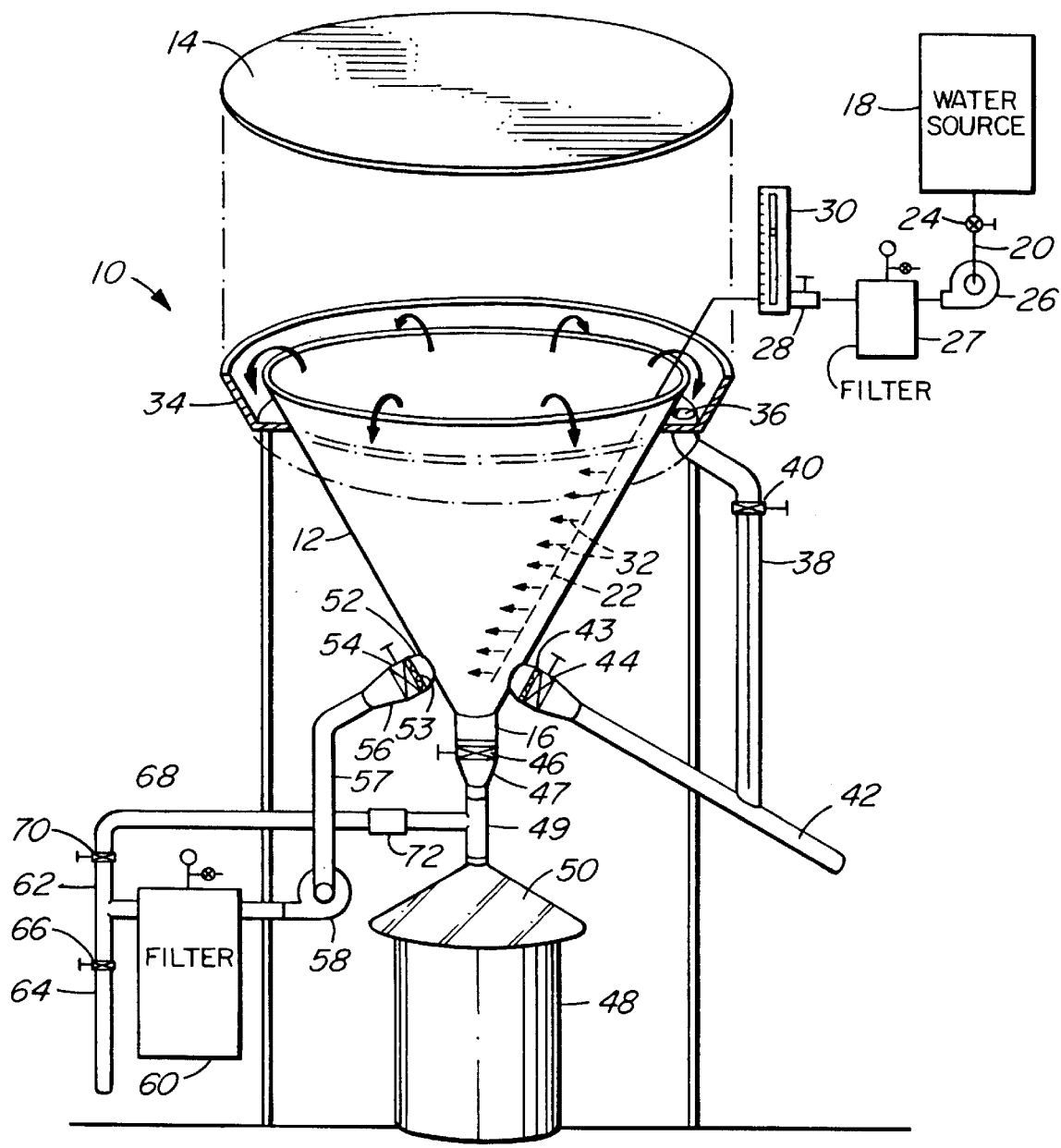

The invention may be fully appreciated by reference to the detailed description which follows in conjunction with the drawings in which:

FIG. 1 is a cross-sectional view of the apparatus according to the preferred embodiment of the invention.

FIG. 1 is a cross-sectional view of the overall apparatus 10 according to the preferred embodiment of the invention. The apparatus includes a cleansing vat 12. In the preferred embodiment, the cleansing vat 12 has a capacity of 350 litres. Cleansing vat 12 may be provided with a clear plastic cover 14 to allow viewing of the cleansing operation. Cleansing vat 12 is provided with an outlet 16 at the apex of the vat 12 for discharging clean and unflawed beads as will be described in more detail below.

A source of clean water 18 is provided. A 1 inch water supply line 20 is provided between the source 18 and a single manifold distribution pipe 22. Line 20 is provided with a valve 24 the opening of which is activated by the operation of a pump 26 also provided in line 20. Line 20 is provided with a water filter 27 which is adapted to screen out impurities larger than 0.45 micrometers. This size of filter is adequate to remove most microbes. A needle valve 28 and an adjustable water meter 30 cooperate to ensure a flow rate to the distribution pipe 22 of approximately 20 U.S. gallons per minute. The flow rate is adjustable to a variety of flow rates and need not to be specifically 20 U.S. gallons but rather should be the best applicable flow rate to remove flawed beads.

Distribution pipe 22 extends downward along the inner wall of the cleansing vat 12 to a point near the outlet 16. A series of directional and adjustable spray or flow nozzles 32 extend along the distribution pipe 22 and are oriented in a variety of directions in order to induce turbulence in the cleansing vat 12.

A drip ring 34 extends around the periphery of the top edge of the cleansing vat 12 so as to leave a space between the drip ring 34 and the cleansing vat 12 of about 2 inches wide, 6 inch deep and extending 2 inch above the vat sidewall 12. The bottom of the space between the drip ring 34 and the cleansing vat 12 is provided with a base (not shown) to direct liquid falling in the space to an outlet 36 mounted in a side of the drip ring 34. Outlet 36 leads to a discharge pipe 38. Discharge pipe 38 preferably has a diameter of 2 inch and is provided with a sight tube or a see-through portion so that the flow of water discharging from vat 12 is easily seen at a glance.

Discharge pipe 38 includes a butterfly valve 40. Discharge pipe 38 discharges into a drain to waste line 42 which runs from a position near the outlet 16 of the vat 12. A valve 44 regulates the flow of liquid from the vat 12 into the drain to waste line 42. A 4 inch #20 screen gasket 43 is mounted upstream of the valve 44. Valve 44 is only used to discharge bead rinse water once the beads are thoroughly rinsed or cleaned.

The outlet 16 of the vat 12 includes a butterfly valve 46. Downstream of the butterfly valve 46 is a conical section 47 and a T section 49 leading to a bead shipping drum 48. The bead shipping drum 48 is covered with a clear plastic cover 50, preferably of conical shape, to shield against airborne contaminants from falling inside of the bead shipping drum 48.

A further outlet 52 is provided near the outlet 16 of the cleansing vat 12. A valve 54 regulates the flow of liquid from the outlet 52 and a 4 inch #20 screen gasket 53 is mounted upstream of the valve 54. Immediately downstream of the valve 54 is a conical section 56 leading to a 2 inch pipe 57 which in turn leads to a 20 m gallons per minute pump 58 and a filter 60. Filter 60 is a filter adapted to remove fines greater than 0.45 micrometers in diameter. This section is used to drain off the preservative and filter it for reuse in a cleansed form, as described below.

Downstream of the filter 60 is a T section 62 one leg of which leads to a drain to waste line 64 regulated by a valve 66 and the other leg of which leads to a return pipe 68 which discharges into T section 49. A valve 70 is provided in return pipe 68 as well as a one way check valve 72. These fixtures will direct the preservative either to flow back into the bead shipping drum 48 or to drain to waste through line 64.

The operation of the apparatus will now be described.

A suspension of beads in preservative is poured into cleansing vat 12. The conical shape of the cleansing vat prevents the beads in suspension from bunching up, contributes to preventing damage to the beads and allows for less traumatic processing of the suspension. The use of gravity as the principal motive force to feed the beads from the vat 12, through the outlet 16 and into the bead drum 48 minimizes the stress placed on the beads.

Once the beads in the preservative have been loaded into vat 12, and the Lexan cover is closed, valve 54 is then opened and pump 58 is turned on to drain a desired amount of preservative from the suspension. Screen gasket 53 acts to retain all beads in the vat 12 while allowing the discharge of the preservative (including fines and microbes) to the pipe 57. The conical shape of the section 56 reduces the exit velocity of the preservative. The preservative is filtered by filter 60. The removal of impurities larger than 0.45 micrometers effectively removes most fines and microbes from the preservative. During this process, valve 66 is closed and valve 70 is open to ensure that the filtered preservative is returned to the bead drum 48.

Once the desired amount of preservative has been drained from the suspension in the vat 12, pump 26 is turned on and valve 24 is opened allowing the flow of clean water through the filter 27. Filter 27 removes impurities and microbes. The water is then passed into the distribution pipe 22. Adjustable water meter 30 and needle valve 28 are regulated to ensure a water flow of about 20 U.S. gallons per minute. Simultaneously, valve 40 is also opened to allow fines removal.

Water is expelled from the flow nozzles 32 into the beads in the vat 12. The arrangement of flow nozzles 32 and their directions are chosen to maximize the turbulence and lift caused within the beads and water suspension which is created upon introduction of the water into the vat 12. However, the spray or flow induced at the nozzle outlets is very gentle so as not to damage the beads.

The turbulence in the water/bead suspension also has the effect of causing the flawed and irregularly shaped beads to rise to the top of the vat 12 while the spherical, undamaged beads, which are less affected by the turbulence, sink to the bottom of the vat 12 toward the outlet 16. The flawed beads rising to the top of the suspension will flow over the lip of the vat 12 into the drip ring 34, and ultimately to outlet 36, into discharge pipe 38 and to drain to waste line 42.

Once the beads have been cleaned, pump 26 is shut off, valve 24 is closed, and valve 44 is opened to drain the water from the suspension in the vat 12 to the drain to waste line 42. Sight tube 38 allows the operator to determine when the vat 12 has been emptied of water. Once the water has been drained, valve 44 is closed and valve 46 is opened to allow the discharge of beads from the vat 12 into the bead drum 48. The conical shape of section 47 allows for a smooth flow of beads through the outlet 16. The beads then free fall into the bead drum 48 which contains the filtered preservative which has previously been discharged into the drum 48 through pipe 68.

It will be appreciated by those skilled in the art that the invention allows the beads and the preservative to be substantially cleaned before being further processed for integration with a beverage product, with minimal loss of integrity of undamaged beads.

It will be appreciated by those skilled in the art that certain variations of the preferred embodiment of the invention may be practised without departing from the principles thereof.

I claim:

1. Apparatus for cleaning a suspension of fragile beads having a high water content suspended in a preservative, comprising:

a cleansing vat for holding a quantity of said suspension, said vat having a top portion and said top portion having discharge means;

flow nozzles in the cleansing vat to induce turbulence in said vat whereby to clean the beads and to cause flawed beads to rise to the top of the suspension and to be discharged by said discharge means;

means for removing the preservative from said vat and cleaning said preservative;

means for combining the contents of said vat and said cleaned preservative.

2. Apparatus as in claim 1 wherein said means for removing and cleaning said preservative comprises an outlet in said cleansing vat, a path from said outlet to said means for combining, and a filter in said path for removing microbes and fines from said preservative.

3. Apparatus as in claim 2 wherein said cleansing vat has a generally conical shape and includes a bead outlet at the apex of said vat for discharging cleansed beads into said means for combining.

4. Apparatus as in claim 3 wherein said means for combining comprises a drum for receiving cleansed preservative and cleansed beads.

5. Apparatus as in claim 1 wherein said cleansing vat has a generally conical shape and said flow nozzles are distributed on a distribution pipe extending from near the top of said cleansing vat to near the bottom of said cleansing vat.

6. Apparatus as in claim 2 or 3 wherein said discharge means comprises an open top portion for allowing said flawed beads and fines to flow over an open edge of said top portion.

* * * * *